(12) United States Patent
Pan

(10) Patent No.: US 8,015,916 B2
(45) Date of Patent: Sep. 13, 2011

(54) TOASTER CHASSIS

(75) Inventor: Huandong Pan, Cixi (CN)

(73) Assignee: Ningbo Changsheng Electric Appliances Co., Ltd., Ningbo (CN)

( * ) Notice: Subject to any disclaimer, the term of this patent is extended or adjusted under 35 U.S.C. 154(b) by 545 days.

(21) Appl. No.: 12/207,579

(22) Filed: Sep. 10, 2008

(65) Prior Publication Data

US 2009/0064870 A1    Mar. 12, 2009

(30) Foreign Application Priority Data

Sep. 10, 2007 (CN) .......................... 2007 1 0071269

(51) Int. Cl.
*A47J 37/08* (2006.01)
(52) U.S. Cl. ............................... 99/388; 99/391; 99/393
(58) Field of Classification Search .................... 99/385, 99/388, 389, 391, 393
See application file for complete search history.

(56) References Cited

U.S. PATENT DOCUMENTS

| | | | | |
|---|---|---|---|---|
| 1,596,081 A * | 8/1926 | Coleman | | 99/391 |
| 1,949,124 A * | 2/1934 | Kuhn et al. | | 99/393 |
| 4,404,899 A * | 9/1983 | Weiss | | 99/391 |
| 5,156,637 A * | 10/1992 | Wai-Ching | | 99/388 |
| 5,664,481 A * | 9/1997 | Huggler | | 99/389 |
| 5,664,483 A * | 9/1997 | Yip | | 99/391 |
| 5,943,948 A * | 8/1999 | Tanaka | | 99/388 |
| 6,112,648 A * | 9/2000 | Origane | | 99/388 |
| 6,343,543 B1 * | 2/2002 | Belknap et al. | | 99/389 |
| 6,502,502 B1 * | 1/2003 | Sutton et al. | | 99/391 |
| 6,675,700 B2 * | 1/2004 | Hong | | 99/329 P |
| 6,708,602 B2 * | 3/2004 | Nguyen | | 99/389 |
| 2002/0113053 A1 * | 8/2002 | Nguyen et al. | | 219/386 |
| 2003/0159594 A1 * | 8/2003 | Tan | | 99/385 |
| 2004/0000238 A1 * | 1/2004 | Nguyen | | 99/389 |
| 2006/0180033 A1 * | 8/2006 | Pan et al. | | 99/388 |

* cited by examiner

*Primary Examiner* — Stephen F Gerrity
(74) *Attorney, Agent, or Firm* — Matthias Scholl P.C.; Matthias Scholl

(57) ABSTRACT

Provided is a toaster chassis, comprising at least one heating chamber, a pair of steel meshes, a bread-elevating mechanism, a pair of supporting plates, a pair of grooves, a pair of sliding rods and an extension spring; wherein the supporting plates are disposed on both ends of the heating chamber, the grooves are disposed on the supporting plate, the sliding rods are disposed on the steel mesh, pass through the supporting plate and abut against the grooves, the extension spring is disposed below the bread-elevating mechanism, and both ends of the extension spring are connected to the sliding rods. The invention is applicable for breads with different thickness and capable of ensuring uniformity of heat and consistency of colors on both sides and the upper and lower portion of each thereof.

16 Claims, 10 Drawing Sheets

TOASTER CHASSIS

CROSS-REFERENCE TO RELATED APPLICATIONS

This application claims priority benefits to Chinese Patent Application No. 200710071269.9 filed on Sep. 10, 2007. The contents of all of the aforementioned specifications are incorporated herein by reference.

BACKGROUND OF THE INVENTION

1. Field of the Invention

The invention relates to a toaster, and more particularly to a toaster chassis.

2. Description of the Related Art

Conventionally, a toaster comprises a chassis and a control circuit, and the chassis comprises at least one heating chamber, a pair of steel meshes, a pair of bread-receiving slots, a pair of supporting plates, a plurality of mica heating units and a pattern template. During operation, after breads are put into the bread-receiving slots and the toaster is started, the bread-receiving slots force the breads to move downwards, the steel meshes and the mica heating units respectively fix and heat the breads, and the pattern template presents different patterns thereon.

However, the heating chamber is comparatively small and only fit for heating thin breads. If the heating chamber is enlarged, as thin breads are disposed in the bread-receiving slot, only an upper portion of the steel mesh will be contacted with the breads, and a lower portion thereof will move, which leads to non-uniformity of heat and inconsistency of colors on both sides and the upper and lower portion of each of the breads.

SUMMARY OF THE INVENTION

In view of the above-described problems, it is one objective of the invention to provide a toaster chassis applicable for breads with different thickness and capable of ensuring uniformity of heat and consistency of colors on both sides and the upper and lower portion of each thereof.

To achieve the above objectives, in accordance with one embodiment of the invention, provided is a toaster chassis, comprising at least one heating chamber, a pair of steel meshes, a bread-elevating mechanism, a pair of supporting plates, a pair of grooves, a pair of sliding rods and an extension spring; wherein the supporting plates are disposed on both ends of the heating chamber, the grooves are disposed on the supporting plate, the sliding rods are disposed on the steel mesh, pass through the supporting plate and abut against the grooves, the extension spring is disposed below the bread-elevating mechanism, and both ends of the extension spring are connected to the sliding rods.

In certain embodiments of the present invention, a pair of crank shafts corresponding to the steel meshes are disposed below the heating chamber, the crank shaft comprises a pair of axle bars disposed on both ends thereof and a curved bar disposed in the center thereof, the axle bar is connected to the supporting plate, and a connecting ring is integrally disposed below the steel mesh and fastened on the curved bar.

In certain embodiments of the present invention, a pattern template is disposed on the steel mesh.

In certain embodiments of the present invention, a pair of buckles are disposed above the pattern template, and a pair of fasteners are disposed below the pattern template.

In certain embodiments of the present invention, a plurality of steel wires are disposed on the steel mesh, the buckle is disposed on an upper portion of the pattern template and fit on the steel wire, and the fastener is disposed on a lower portion of the pattern template and fixed to one of the sliding rods.

In certain embodiments of the present invention, the toaster chassis further comprises a slider connected to an external button and disposed on one side of the supporting plate.

In certain embodiments of the present invention, a reset spring is disposed on the slider, a sliding groove is disposed on the supporting plate, the bread-elevating mechanism passes through the sliding groove, and the slider is fixedly connected to the bread-elevating mechanism.

In certain embodiments of the present invention, the toaster chassis further comprises a slingshot disposed in the center of the supporting plate and having a pair of elastic supporting bars.

In certain embodiments of the present invention, the elastic supporting bar abuts against the inner side of each of the steel meshes.

In certain embodiments of the present invention, the toaster chassis further comprises a plurality of mica heating units disposed on both sides of the heating chamber.

In certain embodiments of the present invention, a separator is disposed between the mica heating unit and the steel mesh.

In certain embodiments of the present invention, the number of heating chambers is two.

In certain embodiments of the present invention, the toaster chassis further comprises a plurality of bread-receiving slots disposed below the heating chamber.

Advantages of the invention are: as the toaster is started, the sliders move downwards, the bread-elevating mechanism forces the extension spring to pull the steel meshes along the grooves in parallel and to uniformly fix the steel meshes on the surface of the breads, and thus consistency of colors on both sides and the upper and lower portion of each of the breads are ensured; the crank shaft ensures stable movement of the steel meshes; the buckle and the fasteners make it possible to change the pattern template based on different requirements.

BRIEF DESCRIPTION OF THE DRAWINGS

Detailed description will be given below with reference to accompanying drawings, in which.

DETAILED DESCRIPTION OF THE EMBODIMENTS

Figure 1:
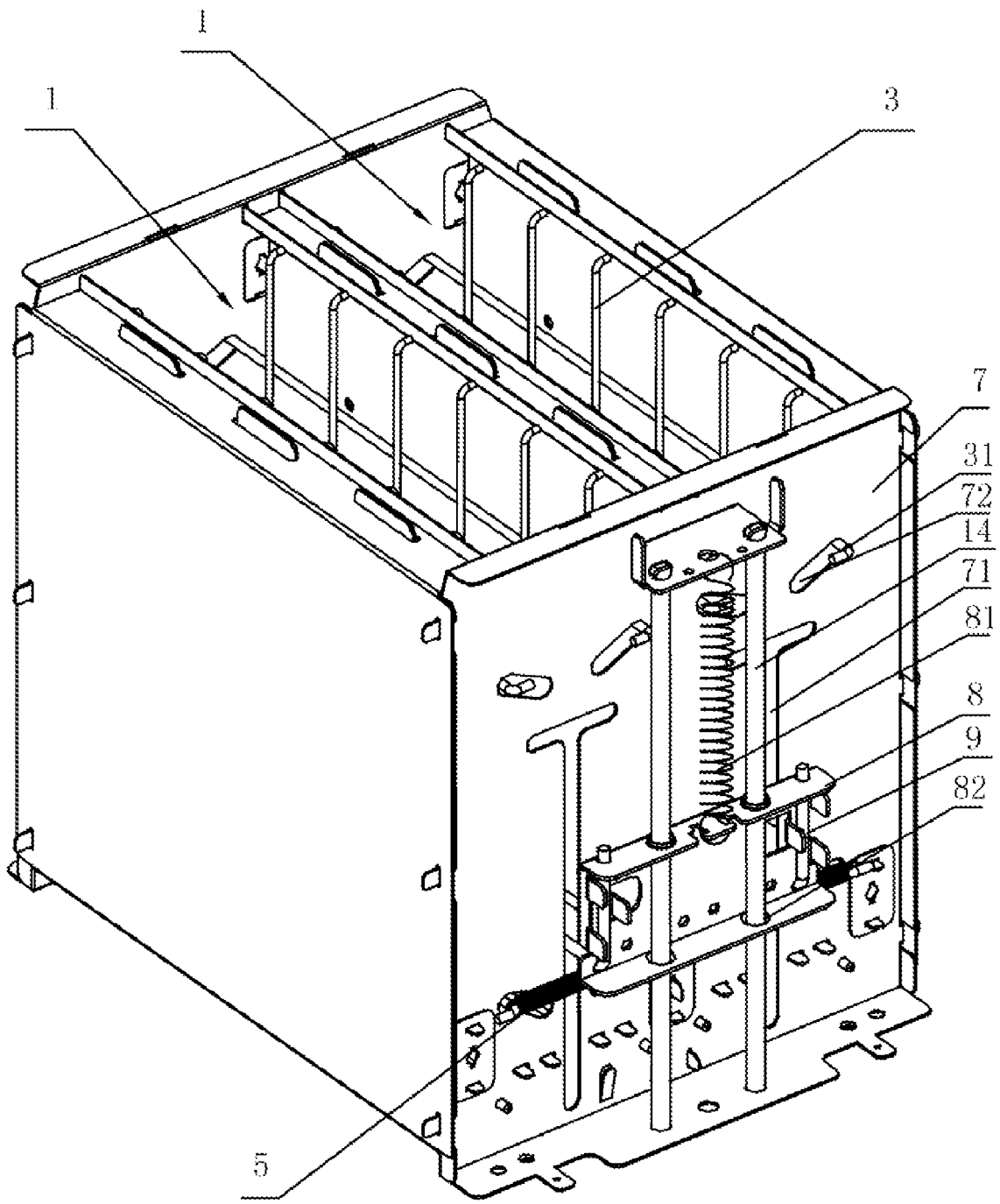
FIG. 1 is a schematic view of a toaster chassis of a first embodiment of the invention.
Figure 2:
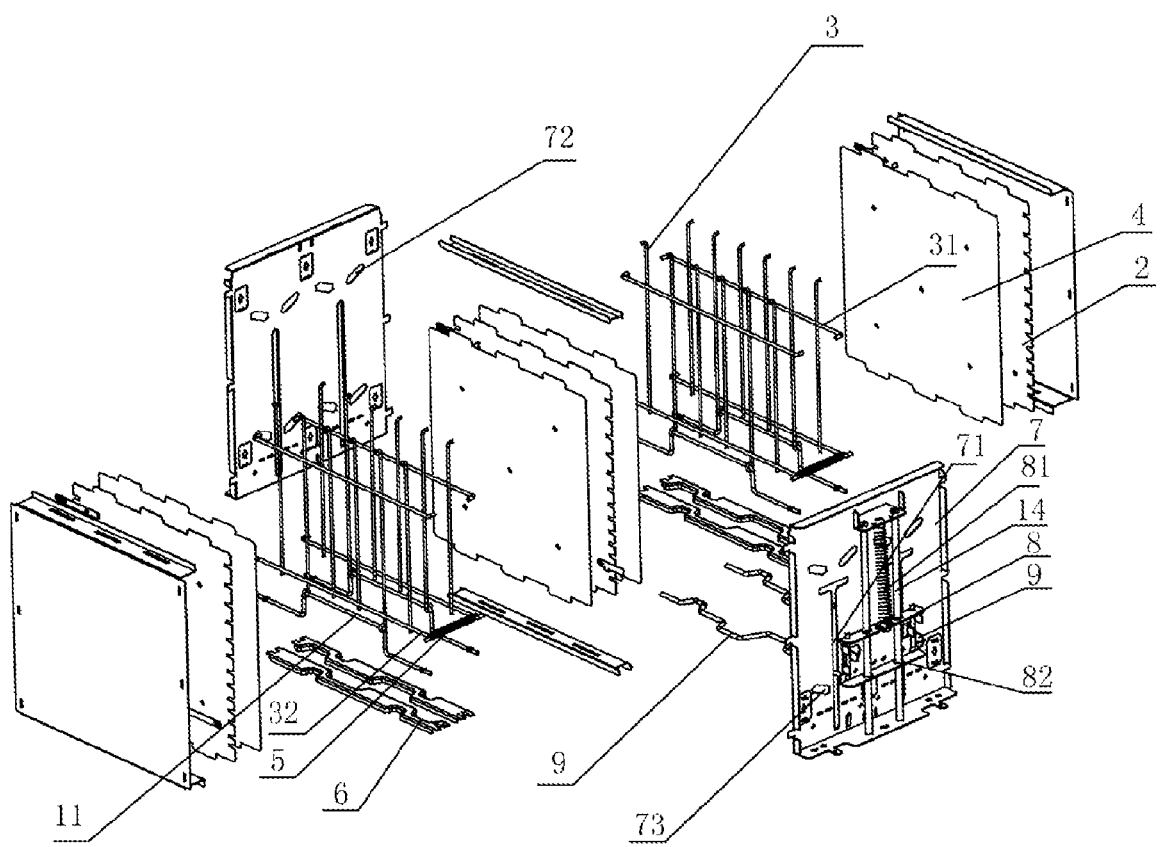
FIG. 2 is an exploded view of a toaster chassis of a first embodiment of the invention.
Figure 3:
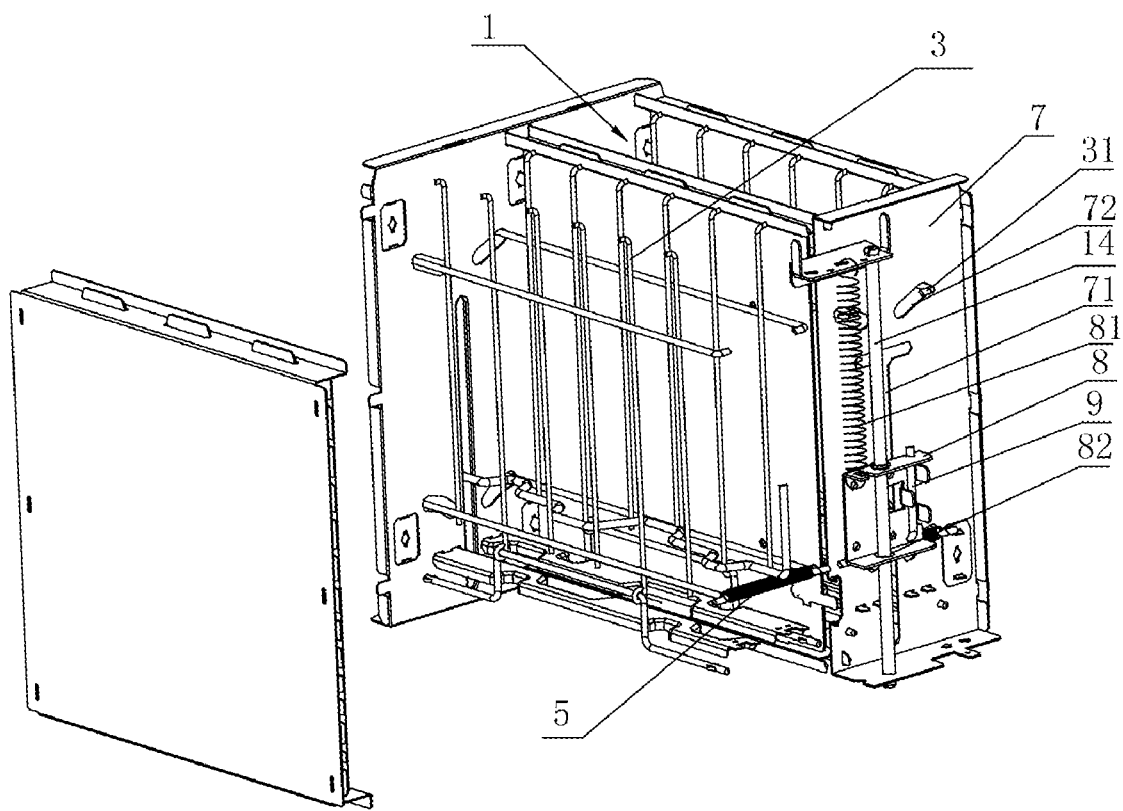
FIG. 3 illustrates a toaster chassis in a non-operating state of a first embodiment of the invention.
Figure 4:
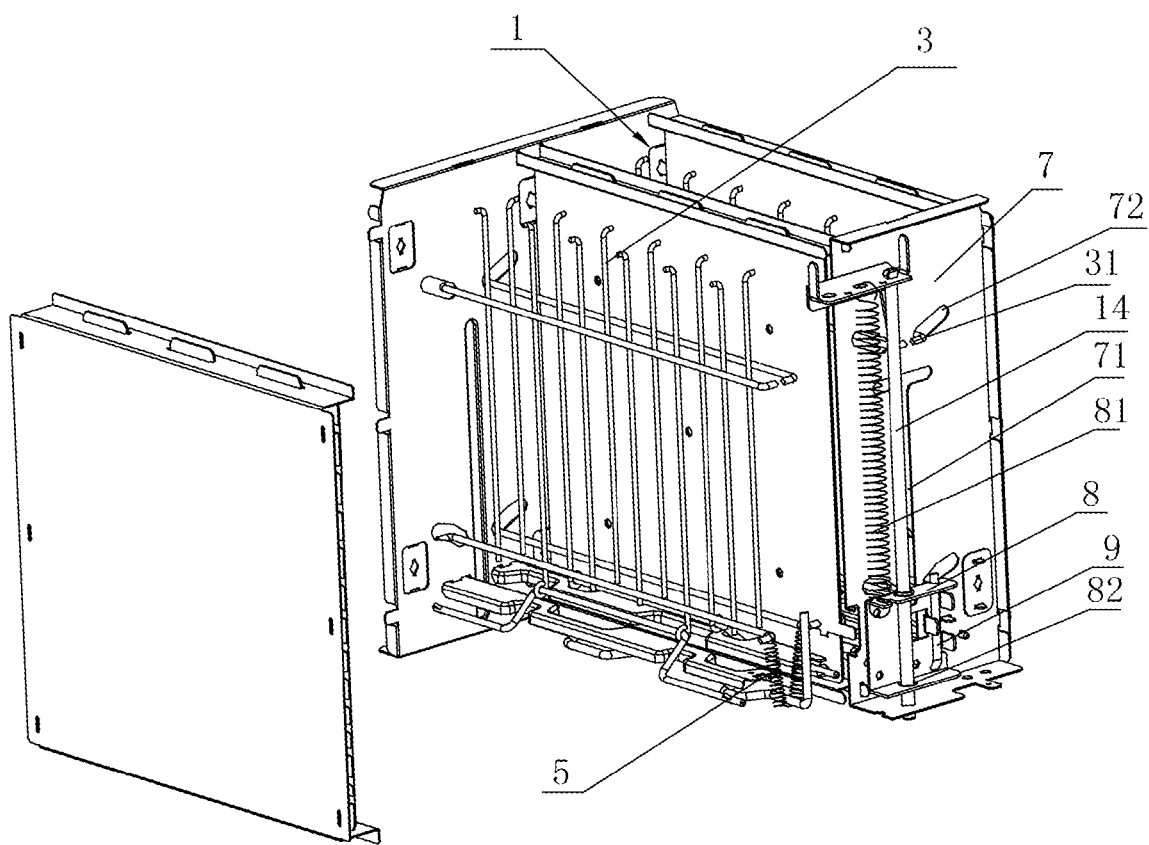
FIG. 4 illustrates a toaster chassis in an operating state of a first embodiment of the invention.

As shown in FIGS. 1-4, a toaster chassis of a first embodiment of the invention comprises a pair of heating chambers 1, a plurality of mica heating units 2, a pair of steel meshes 3, a separator 4, a bread-receiving slot 6, a pair of supporting plates 7, a slider 8 and a bread-elevating mechanism 9. The steel meshes 3 are disposed in the heating chamber 1, the separator 4 is disposed between the mica heating unit 2 and the steel mesh 3, the bread-receiving slot 6 is disposed below the heating chamber 1, the supporting plate 7 is disposed on both ends of the heating chamber 1, and the slider 8 is connected to an external button (not shown) and disposed on one side of said supporting plate 7.

A pair of crank shaft 11 corresponding to the steel meshes 3 are disposed below the heating chamber 1, and each comprises a pair of axle bars 111 disposed on both ends thereof and a curved bar 112 disposed in the center thereof. The axle bar 111 is connected to the supporting plate 7.

An upper sliding rod 31 and a lower sliding rod 32 are disposed on the steel mesh 3 and pass through the supporting plate 7. A connecting ring 33 is integrally disposed below the steel mesh 3 and fastened on the curved bar 112.

The extension spring 5 is disposed below the bread-elevating mechanism 9, and both ends of the extension spring 5 are connected to the lower sliding rods 32. As the extension spring 5 straightens, it forces the lower sliding rods 32 to move, and the steel meshes 3 are released.

A sliding groove 71, an upper groove 72 and a lower groove 73 are disposed on the supporting plate 7. The upper sliding rod 31 and the lower sliding rod 32 respectively abut against the upper groove 72 and the lower groove 73.

A reset spring 81 and a guide hole 82 are disposed on the slider 8.

A guiding axle 14 is disposed outside the supporting plates 7, and passes through the guide hole 82.

Figure 5:
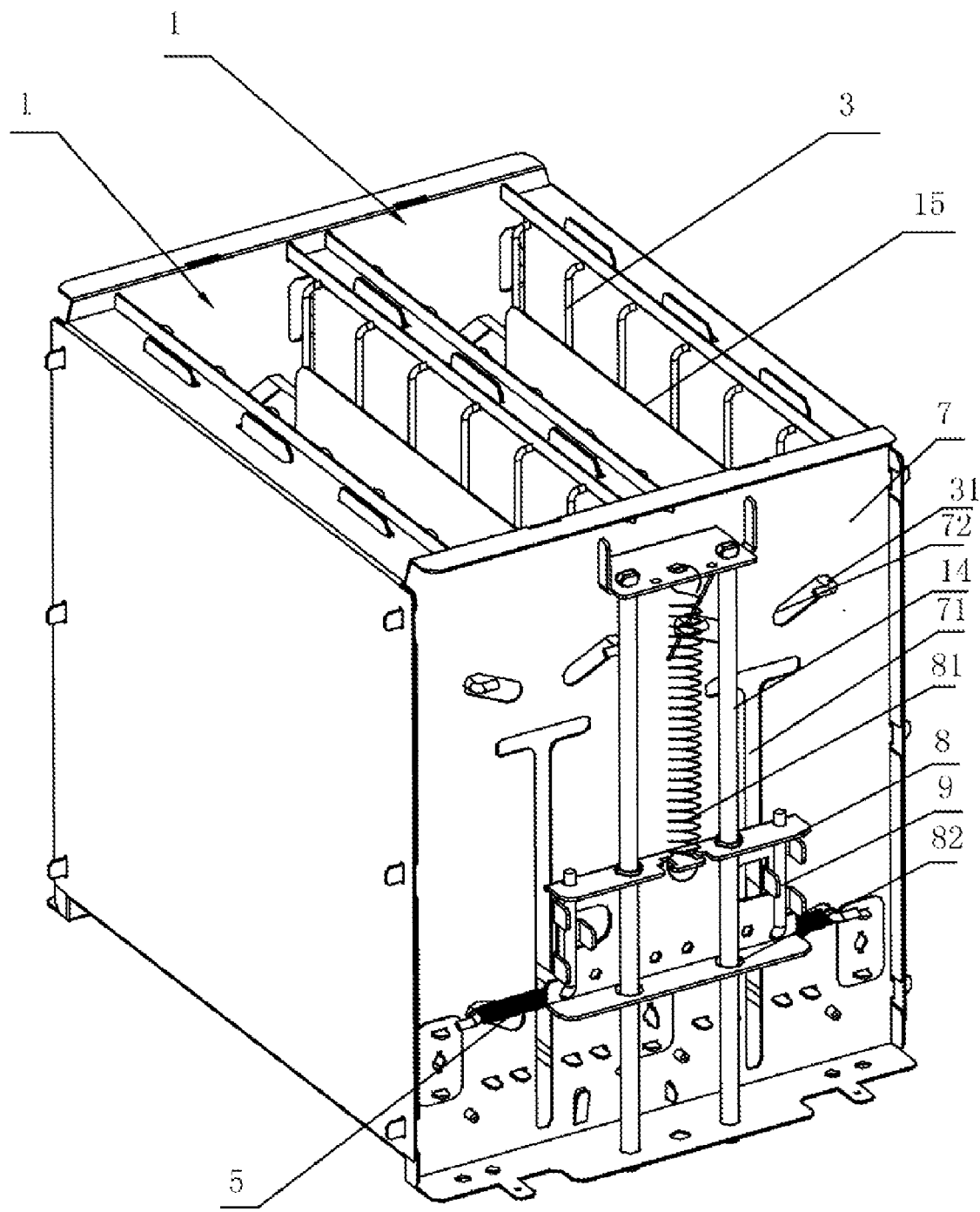
FIG. 5 is a schematic view of a toaster chassis of a second embodiment of the invention.
Figure 6:
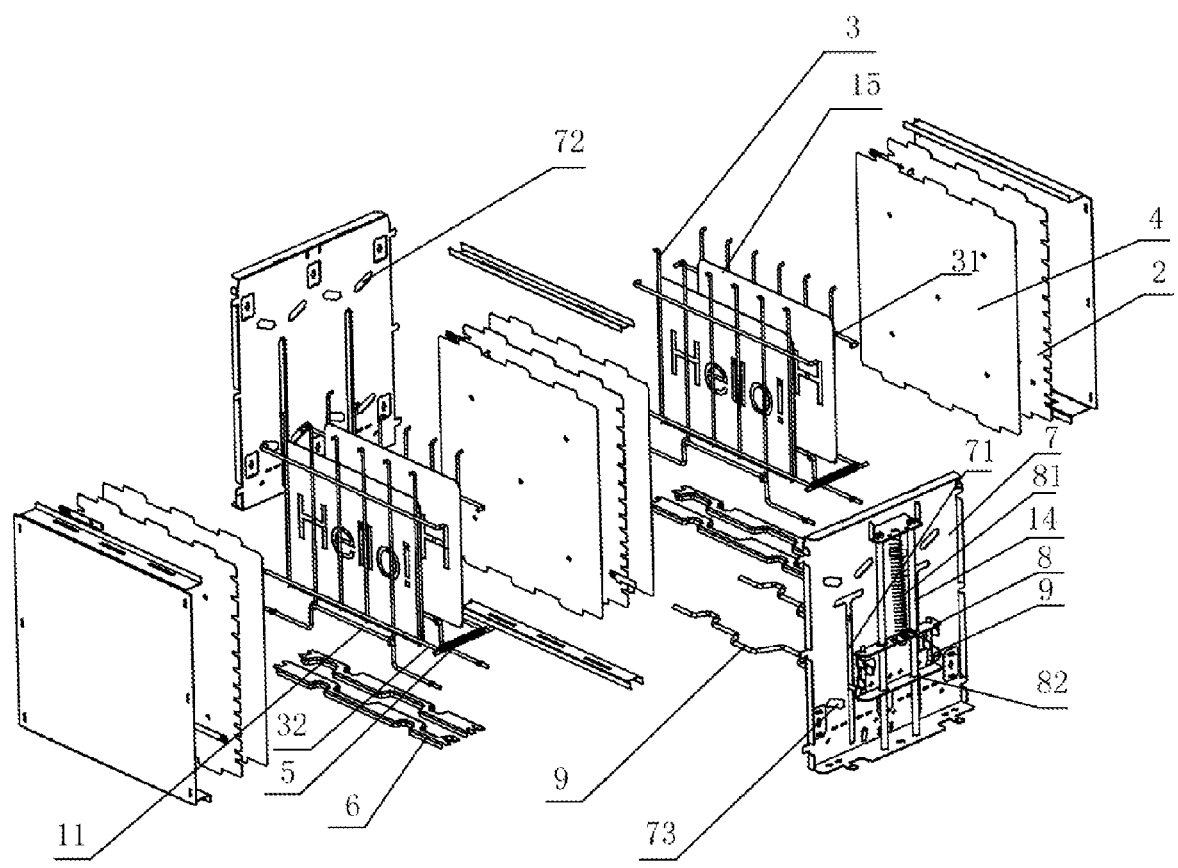
FIG. 6 is an exploded view of a toaster chassis of a second embodiment of the invention.
Figure 7:
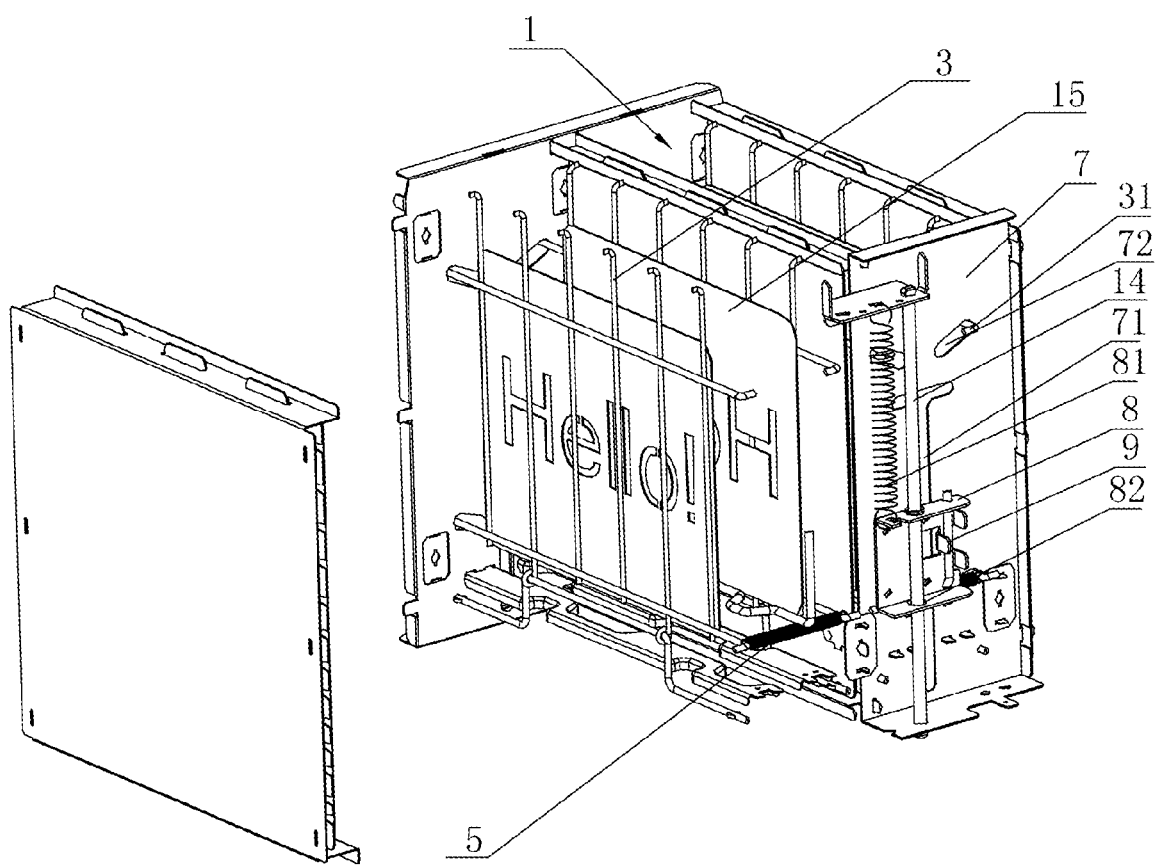
FIG. 7 illustrates a toaster chassis in a non-operating state of a second embodiment of the invention.
Figure 8:
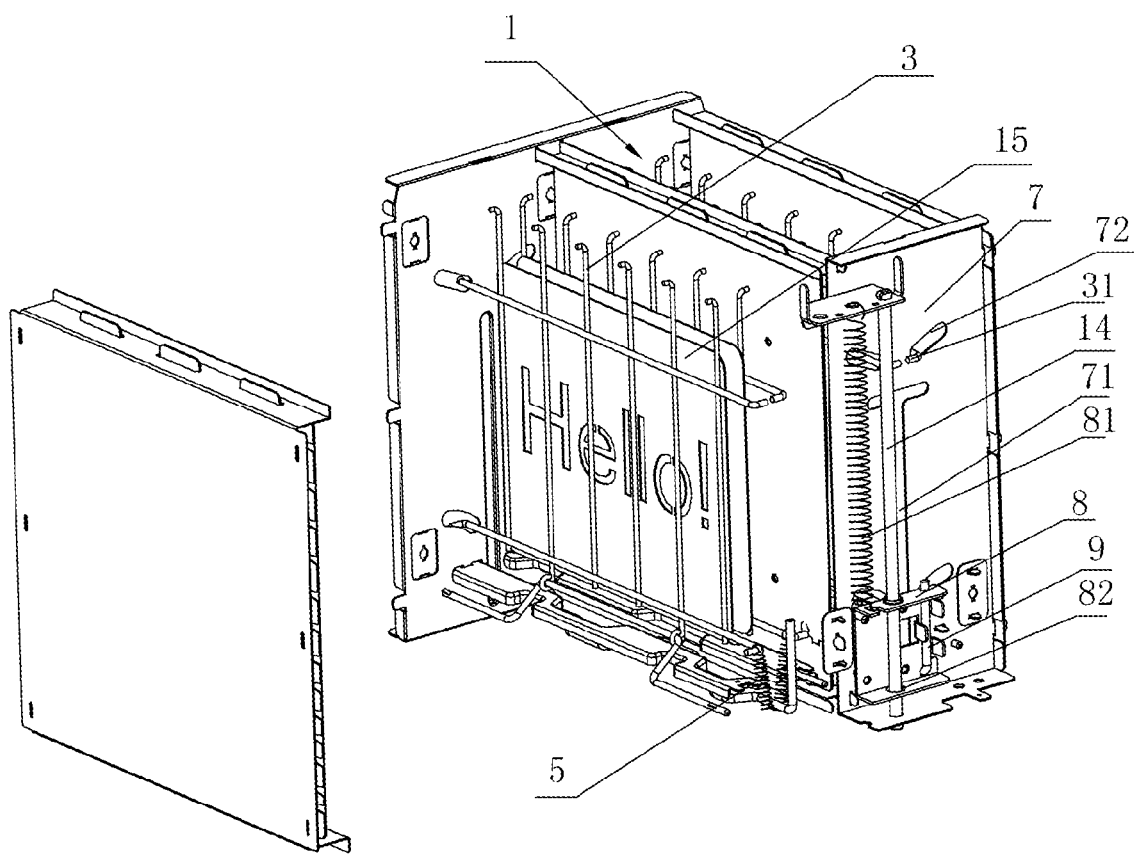
FIG. 8 illustrates a toaster chassis in an operating state of a second embodiment of the invention.
Figure 9:
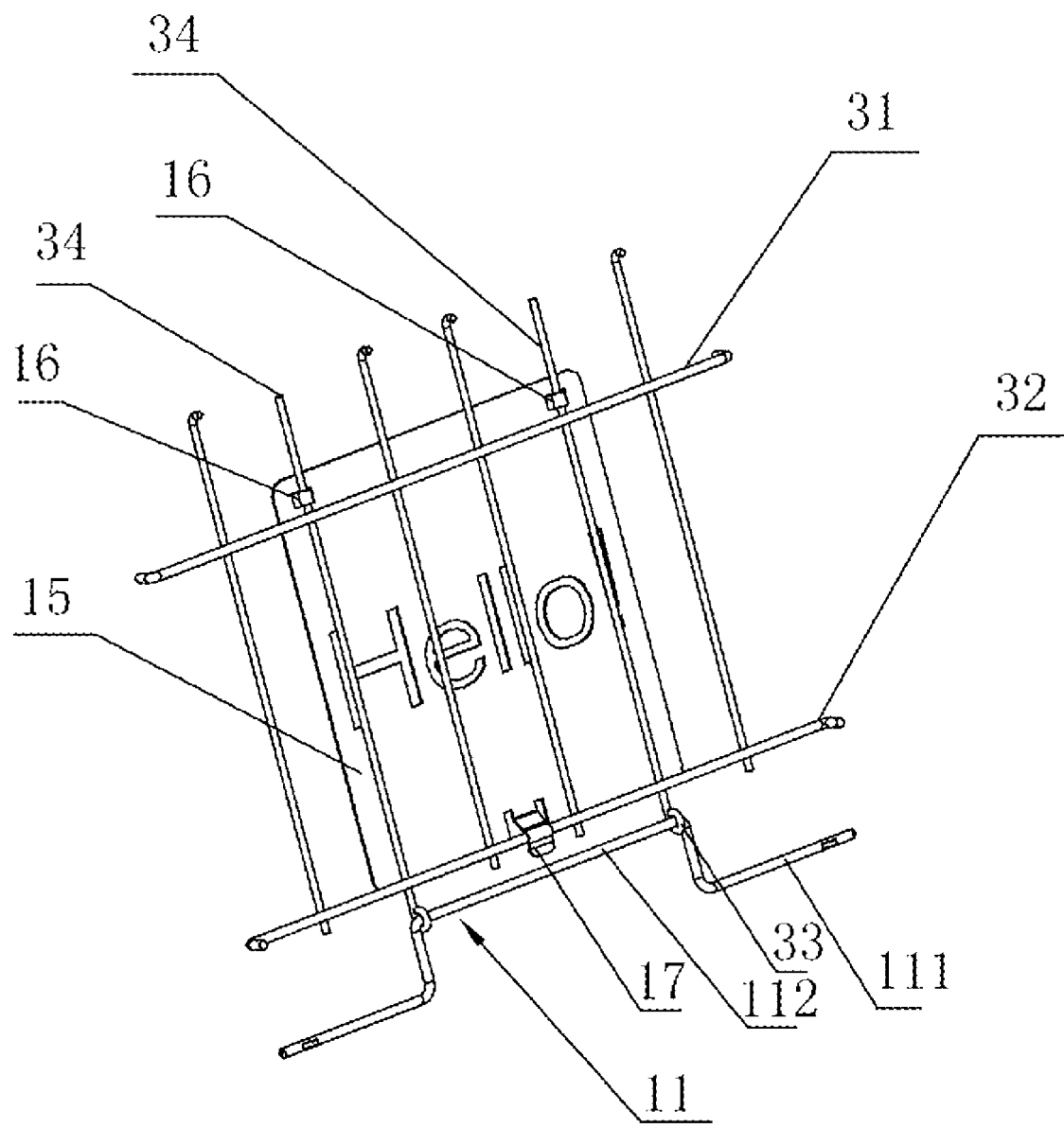
FIG. 9 illustrates a scenario where a pattern template cooperates with a steel mesh of a third embodiment of the invention.
Figure 10:
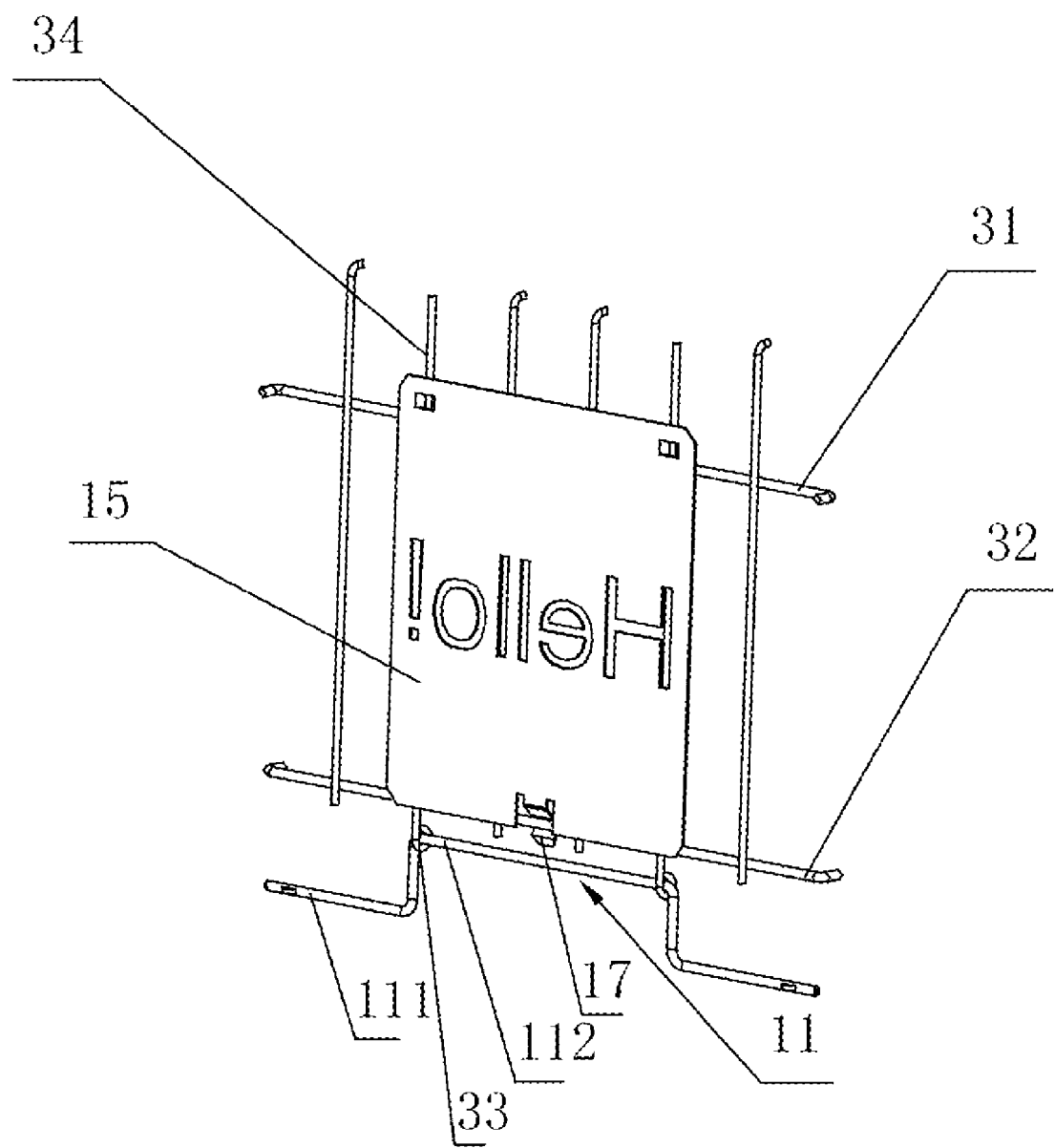
FIG. 10 illustrates another scenario where a pattern template cooperates with a steel mesh of a third embodiment of the invention.

As shown in FIGS. 5-8, a toaster chassis of a second embodiment of the invention comprises a pair of heating chambers 1, a plurality of mica heating units 2, a pair of steel meshes 3, a separator 4, a bread-receiving slot 6, a pair of supporting plates 7, a slider 8, a bread-elevating mechanism 9 and a slingshot. The steel meshes 3 are disposed in the heating chamber 1, the separator 4 is disposed between the mica heating unit 2 and the steel mesh 3, the bread-receiving slot 6 is disposed below the heating chamber 1, the supporting plate 7 is disposed on both ends of the heating chamber 1, the slider 8 is connected to an external button (not shown) and disposed on one side of said supporting plate 7, and the slingshot is disposed in the center of the supporting plate 7, and comprises a pair of elastic supporting bars.

A pair of crank shafts 11 corresponding to the steel meshes 3 are disposed below the heating chamber 1, and each comprises a pair of axle bars 111 disposed on both ends thereof and a curved bar 112 disposed in the center thereof. The axle bar 111 is connected to the supporting plate 7.

An upper sliding rod 31 and a lower sliding rod 32 are disposed on the steel mesh 3 and pass through the supporting plate 7. A connecting ring 33 is integrally disposed below the steel mesh 3 and fastened on the curved bar 112.

The extension spring 5 is disposed below the bread-elevating mechanism 9, and both ends of the extension spring 5 are connected to the lower sliding rods 32. As the extension spring 5 straightens, it forces the lower sliding rods 32 to move, and the steel meshes 3 are released.

A sliding groove 71, an upper groove 72 and a lower groove 73 are disposed on the supporting plate 7. The upper sliding rod 31 and the lower sliding rod 32 respectively abut against the upper groove 72 and the lower groove 73.

A reset spring 81 and a guide hole 82 are disposed on the slider 8.

A guiding axle 14 is disposed outside the supporting plates 7, and passes through the guide hole 82.

The elastic supporting bar of the slingshot abuts against the inner side of each of the steel meshes 3.

In a third embodiment of the invention, all elements are the same as those in the first embodiment, except for a pattern template 15 disposed on the steel mesh 3.

In a fourth embodiment of the invention, all elements are the same as those in the third embodiment, except for a plurality of steel wires 34 disposed on the steel mesh 3, a pair of buckles 16 disposed on an upper portion of the pattern template 15 and fit on the steel wires 34, and a plurality of fasteners 17 disposed on a lower portion of the pattern template 15 and fixed to one of the sliding rods 32.

Operation principle of the first embodiment of the invention is, as breads are put into the heat chamber 1 and the toaster is started, the bread-receiving slots 9 on the slider 8 move downwards to a certain position, where the breads detach from the bread-elevating mechanism 9 and are supported by the bread-receiving slots 6. Meanwhile, pulling force applied by the bread-elevating mechanism 9 on the extension spring 5 causes the steel mesh 3 to clip the breads, electromagnets (not shown) in the toaster attracts the slider 8. After a predetermined toasting time is up, the electromagnets are released, the slider 8 and the bread-elevating mechanism 9 force the reset spring 81 to move the breads upwards, and the toasting process is completed. In a case that the pattern template 15 exists, patterns with consistent colors are presented on both sides and the upper and lower portion of each of the breads. As the extension spring 5 straightens, it forces the lower sliding rods 32 to move, and the steel meshes 3 are released.

Operation principle of the second embodiment of the invention is, as breads are put into the heat chamber 1 and the toaster is started, the bread-elevating mechanism 9 on the slider 8 move downwards to a certain position, where the breads detach from the bread-elevating mechanism 9 and are supported by the bread-receiving slots 6. Meanwhile, pulling force applied by the bread-elevating mechanism 9 on the extension spring 5 causes the steel mesh 3 to clip the breads, electromagnets (not shown) in the toaster attracts the slider 8. After a predetermined toasting time is up, the electromagnets are released, the slider 8 and the bread-elevating mechanism 9 force the reset spring 81 to move the breads upwards, and the toasting process is completed. In a case that the pattern template 15 exists, patterns with consistent colors are presented on both sides and the upper and lower portion of each of the breads. As the extension spring 5 and the slingshot straighten, they force the upper sliding rod 31 and the lower sliding rod 32 to move, and the steel meshes 3 are released.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

What claimed is:

1. A toaster chassis, comprising:
at least one heating chamber;
a pair of steel meshes;
a bread-elevating mechanism;
a pair of supporting plates;
a pair of grooves;
a pair of sliding rods; and
an extension spring;
wherein
said supporting plates are disposed on both ends of said heating chamber;
said grooves are respectively disposed on said supporting plates;
said sliding rods are respectively disposed on said steel meshes, pass respectively through said supporting plates and abut respectively against said grooves;
said extension spring is disposed below said bread-elevating mechanism;
both ends of said extension spring are connected to said sliding rods;
a pair of crank shafts corresponding to said steel meshes are disposed below said heating chamber;
each said crank shaft comprises a pair of axle bars disposed on both ends thereof and a curved bar disposed in the center thereof;
each said axle bar is respectively connected to said supporting plates; and
a connecting ring is integrally disposed below said steel meshes and respectively fastened on said curved bar.

2. The toaster chassis of claim 1, wherein a pattern template is disposed on one of said steel meshes.

3. The toaster chassis of claim 2, wherein
a pair of buckles are disposed above said pattern template; and
a pair of fasteners are disposed below said pattern template.

4. The toaster chassis of claim 3, wherein
a plurality of steel wires are disposed on one of said steel meshes;
each said buckle is disposed on an upper portion of said pattern template and fit on one of said steel wires; and
each said fastener is disposed on a lower portion of said pattern template and fixed to one of said sliding rods.

5. The toaster chassis of claim 1, further comprising a slider connected to an external button and disposed on one side of one of said supporting plates.

6. The toaster chassis of claim 5, wherein
a reset spring is disposed on said slider;
a sliding groove is disposed on said one of said supporting plates;
said bread-elevating mechanism passes through said sliding groove; and
said slider is fixedly connected to said bread-elevating mechanism.

7. The toaster chassis of claim 5, wherein a pattern template is disposed on one of said steel meshes.

8. The toaster chassis of claim 7, wherein
a pair of buckles are disposed above said pattern template; and
a pair of fasteners are disposed below said pattern template.

9. The toaster chassis of claim 8, wherein
a plurality of steel wires are disposed on one of said steel meshes;
each said buckle is disposed on an upper portion of said pattern template and fit on one of said steel wires; and
each said fastener is disposed on a lower portion of said pattern template and fixed to one of said sliding rods.

10. The toaster chassis of claim 1, further comprising a plurality of mica heating units disposed on both sides of said heating chamber.

11. The toaster chassis of claim 10, wherein a separator is disposed between each said mica heating unit and each said steel mesh.

12. The toaster chassis of claim 11, wherein a pattern template is disposed on one of said steel meshes.

13. The toaster chassis of claim 12, wherein
a pair of buckles are disposed above said pattern template; and
a pair of fasteners are disposed below said pattern template.

14. The toaster chassis of claim 13, wherein
a plurality of steel wires are disposed on one of said steel meshes;
each said buckle is disposed on an upper portion of said pattern template and fit on one of said steel wires; and
each said fastener is disposed on a lower portion of said pattern template and fixed to one of said sliding rods.

15. The toaster chassis of claim 1, wherein the number of heating chambers is two.

16. The toaster chassis of claim 1, further comprising a plurality of bread-receiving slots disposed below said heating chamber.

* * * * *